US012757285B2

(12) United States Patent
Caporal Del Barrio et al.

(10) Patent No.: US 12,757,285 B2
(45) Date of Patent: Oct. 6, 2026

(54) BEAM CORRESPONDENCE

(71) Applicant: Nokia Technologies Oy, Espoo (FI)

(72) Inventors: Samantha Caporal Del Barrio, Aalborg (DK); Smita Shetty, Bangalore (IN); Hisashi Onozawa, Tokyo (JP); Sari Kaarina Nielsen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 18/359,164

(22) Filed: Jul. 26, 2023

(65) Prior Publication Data

US 2024/0064859 A1 Feb. 22, 2024

(30) Foreign Application Priority Data

Aug. 19, 2022 (IN) ............................. 202241047257

(51) Int. Cl.
*H04W 76/28* (2018.01)

(52) U.S. Cl.
CPC .................................. *H04W 76/28* (2018.02)

(58) Field of Classification Search
CPC ................................................ H04B 7/06966
See application file for complete search history.

(56) References Cited

U.S. PATENT DOCUMENTS

2003/0185162 A1* 10/2003 Fraser ............... H04W 52/0277 340/7.32
2012/0157153 A1* 6/2012 Song ................. H04W 52/0245 455/522
2015/0078189 A1 3/2015 Kwon et al.
2017/0367069 A1* 12/2017 Agiwal .................. H04B 7/088
2018/0131434 A1* 5/2018 Islam .................... H04W 16/28
2018/0338332 A1* 11/2018 Lee ................... H04W 52/0216

FOREIGN PATENT DOCUMENTS

WO 2021/173306 A1 9/2021
WO WO-2022025989 A1 * 2/2022 ........... H04B 7/0617

OTHER PUBLICATIONS

"Remaining issues on multi-beam operation", 3GPP TSG RAN WG1 Meeting #100-e, R1-2000926, Agenda: 7.2.6.3, NTT Docomo, Inc, Feb. 24-Mar. 6, 2020, pp. 1-10.
"3rd Generation Partnership Project, Technical Specification Group Radio Access Network; NR; User Equipment (UE) radio transmission and reception; Part 2: Range 2 Standalone (Release 17)", 3GPP TS 38.101-2, V17.7.0, Sep. 2022, pp. 1-217.
"New WID: NR RF requirements enhancement for frequency range 2 (FR2), Phase 3", 3GPP TSG RAN Meeting #95e, RP-220967, Agenda: 9.1.4.2, Nokia, Mar. 17-23, 2022, 4 pages.

(Continued)

*Primary Examiner* — Pamit Kaur
(74) *Attorney, Agent, or Firm* — Robert P. Michal, Esq.; Rimon PC

(57) ABSTRACT

A User Equipment (UE) configured to control lengths of one or more monitoring cycles of the UE based, at least in part on a range of a discontinuous reception (DRX) cycle and one or more power conditions of the UE. The monitoring cycle is used to select a beam for transmission by the UE. The DRX cycle is used by the UE during RRC_INACTIVE state and the range of the DRX cycle determines one or more beam correspondence conditions.

15 Claims, 7 Drawing Sheets

(56) References Cited

OTHER PUBLICATIONS

"Motivation for revision of WID on NR RF Requirement Enhancements for FR2", RP-211175, Nokia, Jun. 2021, pp. 1-2.
"3rd Generation Partnership Project; Technical Specification Group Radio Access Network; NR; User Equipment (UE) procedures in Idle mode and RRC Inactive state (Release 17)", 3GPP TS 38.304, V17.1.0, Jun. 2022, pp. 1-50.
"3rd Generation Partnership Project; Technical Specification Group Radio Access Network; NR; Requirements for support of radio resource management (Release 17)", 3GPP TS 38.133, V17.6.0, Jun. 2022, 3637 pages.
Extended European Search Report received for corresponding European Patent Application No. 23189643.2, dated Feb. 5, 2024, 13 pages.
"C-DRX Beam Management Aspects", 3GPP TSG-RAN WG2 Meeting #97, R2-1701187, Agenda Item: 10.2.1.4, InterDigital Communications, Feb. 13-17, 2017, pp. 1-3.
"Beam Operation Impact for DRX in NR", 3GPP TSG RAN WG2 Meeting NR#2, R2-1707396, Agenda item: 10.3.1.10, National Taiwan University, Jun. 27-29, 2017, 5 pages.

* cited by examiner

BEAM CORRESPONDENCE

TECHNOLOGICAL FIELD

Examples of the disclosure relate to beam correspondence for a User Equipment (UE). Some relate to beam correspondence for a UE in an inactive mode.

BACKGROUND

Beam correspondence enables beams selected for downlink (DL) transmission and reception to be used for uplink (UL) transmission and reception. Examples of the disclosure relate to beam correspondence during inactive modes of the UE.

BRIEF SUMMARY

According to various, but not necessarily all, examples of the disclosure there may be provided a User Equipment (UE) comprising:

at least one processor; and at least one memory storing instructions that, when executed by the at least one processor, cause the UE at least to perform:

controlling lengths of one or more monitoring cycles of the UE based, at least in part on a range of a discontinuous reception (DRX) cycle and one or more power conditions of the UE, wherein the monitoring cycle is used to select a beam for transmission by the UE; and wherein, the DRX cycle is used by the UE during RRC_INACTIVE state and the range of the DRX cycle determines one or more beam correspondence conditions.

The power conditions may be indicative of the available transmission power for the UE.

The power conditions may comprise one or more of: UE implementation factors, channel conditions, orientation of the UE.

The UE implementation factors may comprise at least one of: maximum power output, radio frequency architecture conditions, number of panels, size of the array.

The controlling of the lengths of the one or more monitoring cycles may be configured to conserve power of the UE.

The range of the DRX cycle may comprise at least one of: a short cycle, a long cycle.

The beam correspondence conditions may be determined such that shorter DRX cycles have a higher level of accuracy for the beam correspondence requirements compared to the longer DRX cycles.

The beam correspondence conditions may be determined such that shorter DRX cycle lengths have a higher level of UE transmit power compared to the longer DRX cycle lengths.

According to various, but not necessarily all, examples of the disclosure there may be provided a UE comprising means for:

controlling lengths of one or more monitoring cycles of the UE based, at least in part on a range of a discontinuous reception (DRX) cycle and one or more power conditions of the UE, wherein the monitoring cycle is used to select a beam for transmission by the UE; and wherein, the DRX cycle is used by the UE during RRC_INACTIVE state and the range of the DRX cycle determines one or more beam correspondence conditions.

According to various, but not necessarily all, examples of the disclosure there may be provided a method comprising:

controlling lengths of one or more monitoring cycles of the UE based, at least in part on a range of a discontinuous reception (DRX) cycle and one or more power conditions of the UE, wherein the monitoring cycle is used to select a beam for transmission by the UE; and wherein, the DRX cycle is used by the UE during RRC_INACTIVE state and the range of the DRX cycle determines one or more beam correspondence conditions.

According to various, but not necessarily all, examples of the disclosure there may be provided a computer program comprising computer program instructions that, when executed by processing circuitry, cause;

controlling lengths of one or more monitoring cycles of the UE based, at least in part on a range of a discontinuous reception (DRX) cycle and one or more power conditions of the UE, wherein the monitoring cycle is used to select a beam for transmission by the UE; and wherein, the DRX cycle is used by the UE during RRC_INACTIVE state and the range of the DRX cycle determines one or more beam correspondence conditions.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
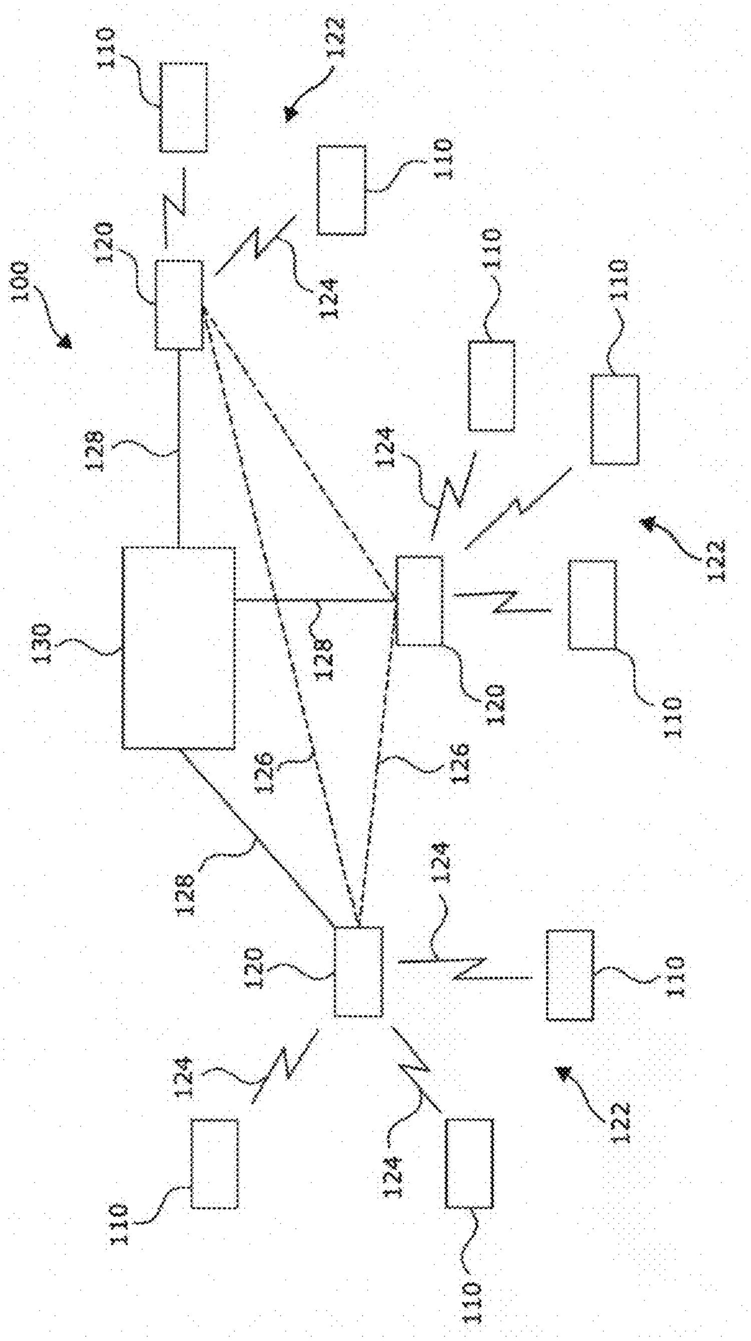
FIG. 1 shows an example network.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

Definitions

CSI Channel State Information
CSI-RS CSI-Reference Signal
DL Downlink
DRX Discontinuous Reception
EIRP Effective Isotropic Radiated Power
FR2 Frequency Range 2
gNB NR base station
NR New Radio
O-RAN Open-Radio Access Network PRB Physical Resource Block
RACH Radio Access Channel
RAN Radio Access Network
RF Radio Frequency
RRC Radio Resource Channel
RS Reference Signal
SDT Small Data Transmission
SS Synchronization Signal
SSB Synchronization Signal Block
Tx Transmission
UE User Equipment
UL Uplink

DETAILED DESCRIPTION

FIG. 1 illustrates an example of a network 100 comprising a plurality of network entities including terminal apparatus 110, node apparatus 120 and one or more network apparatus 130. The terminal apparatus 110 and node apparatus 120 communicate with each other. The one or more network apparatus 130 communicate with the access nodes 120. In some examples the one or more network apparatus 130 communicate with the terminal apparatus 110.

The one or more network apparatus 130 can, in some examples, communicate with each other. The one or more node apparatus 120 can, in some examples, communicate with each other.

The network 100 can be a cellular network comprising a plurality of cells 122 each served by a node apparatus 120. In this example, the interface between the terminal apparatus 110 and a node apparatus 120 defining a cell 122 is a wireless interface 124.

The node apparatus 120 comprises one or more cellular radio transceivers. The terminal apparatus 110 comprises one or more cellular radio transceivers.

In the example illustrated the cellular network 100 is a third generation Partnership Project (3GPP) network in which the terminal apparatus 110 are user equipment (UE) and the node apparatus 120 can be access nodes such as base stations.

The term 'user equipment' is used to designate mobile equipment comprising a smart card for authentication/encryption etc such as a Subscriber Identity Module (SIM). In some examples the term 'user equipment' is used to designate mobile equipment comprising circuitry embedded as part of the user equipment for authentication/encryption such as software SIM.

The node apparatus 120 can be any suitable base station. A base station is an access node. It can be a network element responsible for radio transmission and reception in one or more cells to or from the UE 110. The node apparatus 120 can be a network element in a Radio Access Network (RAN), an Open-Radio Access Network (O-RAN) or any other suitable type of network.

The network apparatus 130 can be part of a core network. The network apparatus 130 can be configured to manage functions relating to connectivity for the UEs 110. For example, the network apparatus 130 can be configured to manage functions such as connectivity, mobility, authentication, authorization and/or other suitable functions. In some examples the network apparatus 130 can comprise an Access and Mobility management Function (AMF) and/or a User Plane Function (UPF) or any other suitable entities.

In the example of FIG. 1 the network apparatus 130 is shown as a single entity. In some examples the network apparatus 130 could be distributed across a plurality of entities. For example, the network apparatus 130 could be cloud based or distributed in any other suitable manner.

The network 100 can be a 4G or 5G network, for example. It can for example be a New Radio (NR) network that uses gNB or eNB as access nodes 120. New Radio is the 3GPP name for 5G technology. In such cases the node apparatus 120 can comprise gNodeBs (gNBs) 120 configured to provide user plane and control plane protocol terminations towards the UE 110 and/or to perform any other suitable functions. The gNBs 120 are interconnected with each other by means of an X2/Xn interface 126. The gNBs are also connected by means of the N2 interface 128 to the network apparatus 130. The gNBs can be connected to an AMF or any other suitable network apparatus 130. Other types of networks and interfaces could be used in other examples. Other types of network could comprise next generation mobile and communication network, for example, a 6G network.

Beam correspondence can ensure that the DL gNB beam cab be reused for UL within a power threshold. The UE 110 can select a suitable beam for UL transmission based on DL measurements. The beam for UL transmission can be selected with or without UL beam sweeping by the UE 110.

The beam correspondence conditions for power class 3 UEs 110 consists of three components: UE 110 minimum peak Effective Isotropic Radiated Power (EIRP), UE 110 spherical coverage, and beam correspondence tolerance. The beam correspondence requirement is fulfilled if the UE 110 satisfies one of the following conditions, depending on the UE's 110 beam correspondence capability.

If the UE's 110 beam correspondence capability is such that beamCorrespondenceWithoutUL-BeamSweeping is supported, the UE 110 shall meet the minimum peak EIRP requirement according and spherical coverage requirement with its autonomously chosen UL beams and without uplink beam sweeping. Such a UE 110 is considered to have met the beam correspondence tolerance requirement.

If the UE's 110 beam correspondence capability is such that beam Correspondence WithoutUL-BeamSweeping and beamCorrespondenceSSB-based-r16eBeamCorrespondenceSSB are supported, the UE 110 shall meet the minimum peak EIRP requirement and spherical coverage requirement according to using predefined Synchronization Signal Block (SSB) based enhanced beam correspondence requirements.

If the UE's 110 beam correspondence capability is such that beam Correspondence WithoutUL-BeamSweeping and beamCorrespondenceCSI-RS-based-r16eBeamCorrespondenceCSI-RS are supported, the UE 110 shall meet the minimum peak EIRP requirement and spherical coverage requirement using predefined Channel State Information-Reference Signal (CSI-RS) based enhanced beam correspondence requirements.

If the UE's 110 beam correspondence capability is such that beamCorrespondenceWithoutUL-BeamSweeping is not present, the UE 110 shall meet the minimum peak EIRP requirement and spherical coverage requirement with uplink beam sweeping. Such a UE 100 shall meet the defined beam correspondence tolerance requirement and shall support uplink beam management.

If the UE's 110 beam correspondence capability is such that beamCorrespondenceWithoutUL-BeamSweeping is not present and beamCorrespondenceSSB-based-r16eBeamCorrespondenceSSB is supported, the UE 110 shall meet the minimum peak EIRP requirement and spherical coverage requirement with uplink beam sweeping using SSB based enhanced beam correspondence requirements.

Such a UE 110 shall meet the beam correspondence tolerance requirement and shall support uplink beam management.

If the UE's 110 beam correspondence capability is such that beam Correspondence WithoutUL-BeamSweeping is not present and beamCorrespondenceCSI-RS-based-r16eBeamCorrespondenceCSI-RS is supported, the UE 110 shall meet the minimum peak EIRP requirement and spherical coverage requirement according to with uplink beam sweeping using CSI-RS based enhanced beam correspondence requirements. Such a UE 110 shall meet the beam correspondence tolerance and shall support uplink beam management.

In networks such as the network 100 of FIG. 1 mobile traffic data is often transmitted in bursts. This means that the UE 110 is not required to continuously monitor the control channel. Continuous monitoring of the control channel by the UE 110 would result in higher power consumption. Higher power consumption is not ideal as the UE 110 battery has finite power. In order to address this, Discontinuous Reception (DRX) can be enabled in the UE 110 in idle mode, RRC_INACTIVE mode and RRC_CONNECTED. DRX enables the UE 110 to monitor the control or paging channels occasionally and sleep the rest of the time. This is done by means of DRX cycles which are configurable.

The parameters which are used to configure the DRX cycles are in general:

- drx-onDurationTimer: the duration at the beginning of a DRX cycle;
- drx-SlotOffset: the delay before starting the drx-onDurationTimer;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;

A DRX cycle is a duration of on ON time plus one OFF time. DRX cycles can have different ranges. In some examples the ranges of a DRX cycle can be long or short. A short DRX cycle can have a duration between 2 ms to 640 ms. A long DRX cycle can have a duration between 10 ms to 10240 ms.

Long DRX cycles can increase the UE 110 battery power savings but can also make it more likely that the UE 110 is not able to find the correct panel to receive/send data to the gNB 120 and ensure beam correspondence. In a long DRX cycle, the UE 110 can be asleep for longer durations of time. When the UE 110 is asleep the UE 110 could experience varying radio conditions, changes in multi-path propagation, changes in line of sight, changes in Angle of arrival (AoA) owing to rotation of the UE 110, or any other suitable factor that affects the radio conditions. The longer the length of the DRX cycle, the more the chance there is that some of these variations could occur.

When a UE 110 is in an inactive state it may be required to perform Small Data Transmission (SDT) communication. If beam correspondence is not ensured, the UE 110 may choose a sub-optimal panel hence lose up to 15 dB antenna gain and fail to receive/transmit.

In examples of the disclosure, the beam correspondence requirements are dependent upon the ranges of the DRX cycles that are used. The longer the range of the DRX cycle, the more relaxed the beam correspondence conditions can be.

In examples of the disclosure the UE 110 can have different levels of relaxation for the beam correspondence conditions depending on the range of the DRX cycle. The different levels of relaxation can be obtained by defining different UE 110 requirements for different sets of DRX cycles. Different sets of DRX cycles can have different ranges. For instance, a first set of DRX cycles could be short DRX cycles and a second set of DRX cycles could be long cycles.

In examples of the disclosure, for beam correspondence during DRX operations, the UE 110 can be configured to perform one or more of the following options:

- Option 1: relax UE 110 requirements related to Transmission (Tx) power and/or Tx direction error during RRC_INACTIVE and when DRX cycle is configured
- Option 2: relax UE requirements related time for UE measurements before transmission of SDT during RRC_INACTIVE and when DRX cycle is configured.

If the first option is used then the beam correspondence conditions can be defined using the same metrics that are currently used but different values could be used for the respective metrics. For example, the beam correspondence conditions could comprise values for EIRP, spherical coverage and beam correspondence tolerance. One or more of the values could be more relaxed than for the values that are used when the UE 110 is not using DRX. The specific values that are used would dependent on the range of the DRX cycle that is used. Longer DRX cycles would have more relaxed values than shorter DRX cycles.

If the second option is used this provides the UE 110 with more time to obtain accurate beam correspondence and to meet the beam correspondence. This can provide the UE 110 with more time to perform monitoring of DL signals or any other suitable procedures.

Examples of the disclosure could be used for SDT communications in an inactive mode. Examples of the disclosure could be used for Configured Grant SDT and for Radio Access Channel (RACH) for SDT.

In examples of the disclosure the UE 110 can meet the beam correspondence conditions using any one or more of the following:

- Using a gyroscope to estimate rotation of the UE 110 during the sleep period and estimate the correct panel for the UE 110 to use when waking up
- Having a UE 110 Radio Frequency (RF) architecture including splitters to all panels to enable the UE 110 to send simultaneously on all panels to ensure that the correct direction is also covered
- Monitoring Synchronization Signal (SS) burst on all panels during the sleep period
- And/or combinations of these.

Each of these methods for meeting the beam correspondence requirements require power consumption. Examples of the disclosure therefore provide a trade off between power usage and accuracy of the beam correspondence requirements.

In examples of the disclosure stricter beam correspondence requirements can be used for shorter DRX cycles that for longer DRX cycles. This is appropriate because any channel variations are typically larger with longer DRX cycles. The channel variations can be caused by movement of the UE 110, rotation of the UE 110, LOS blockages, or any other suitable factor. The longer the DRX cycle, the higher the likelihood that the panel of the UE 110 that provides maximum alignment is changed during a sleep period. Therefore, it can be appropriate to relax the beam correspondence requirements during such time periods.

Also when shorter DRX cycles are used the SDT scheduling is larger (In Physical Resource Blocks (PRBs)). When longer DRX cycles used the SDT scheduling is smaller (In PRBs). This justifies having stricter beam correspondence conditions for shorter DRX cycles.

Figure 2:
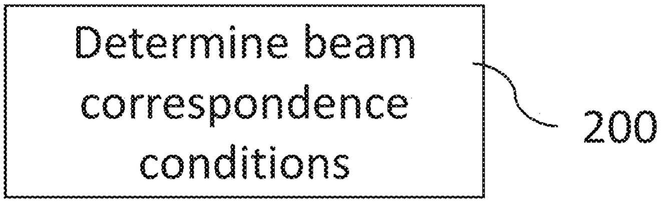
FIG. 2 shows an example method.

FIG. 2 shows an example method that can be used for beam correspondence during inactive modes of a UE 110. The method could be implemented by a UE 110. The method could be implemented by a controller of a UE 110.

The method comprises, at block 200, determining beam correspondence conditions for the UE 110 when the UE 110 is an inactive mode. The beam correspondence conditions can be determined based, at least in part, on a range of a DRX cycle used by the UE 110.

The inactive mode of the UE 110 can be an RRC_INACTIVE state or any other suitable mode. The network 100 can control which mode the UE 110 is in. During the inactive mode the UE 110 may be required to perform SDT communication.

Different procedures can be used for the different ranges of the DRX cycles. The DRX cycle can be a short cycle or a long cycle. Other types or ranges of DRX cycle could be used. The range of the DRX cycle can be signaled to the UE 110 by the network 100 with which the UE 110 is communicating.

The beam correspondence conditions can be determined such that shorter DRX cycles have a higher level of accuracy for the beam correspondence requirements compared to the longer DRX cycles. The short DRX cycles can have a lower level of accuracy compare to instances when DRX is not being used.

The beam correspondence conditions can be determined such that shorter DRX cycles have a higher UE 110 transmit power for the beam correspondence requirements compared to the longer DRX cycles. The UE 110 transmit power can be measured as minimum peak EIRP in dB.

The beam correspondence conditions can comprise a plurality of different components. The beam correspondence condition can comprise a transmission power level for the UE 110. The transmission power level can be a minimum peak EIRP, spherical coverage or any other suitable condition. The beam correspondence condition can comprise a level of accuracy for a beam direction of the UE 110. The level of accuracy can comprise a beam correspondence tolerance. This can comprise an indication of the level of error that can be tolerated in the direction of the beam while still maintaining beam correspondence. The level of accuracy can be given in terms of received power at a gNB 120 within the network 100 and/or in degrees of alignment of a UE Tx beam.

In some examples the beam correspondence conditions can comprise a duration for UE 110 measurements. The duration for UE 110 measurements can indicate the length of time that the UE 110 can monitor for downlink reference signals during the inactive mode. The duration for the UE 110 measurements can be dependent upon the required accuracy for the UE 110 Tx beam. For instance, if the beam correspondence conditions require a high level of accuracy then it may be necessary to perform more measurements to ensure that the correct beam is selected. If the beam correspondence conditions do not require a high level of accuracy then it may only be necessary to perform a small number measurements to ensure that the correct beam is selected. In some examples, it might be that no measurements are needed. Therefore, a shorter duration for the UE measurements could be used if the beam correspondence conditions have been relaxed. Therefore, the UE 110 can determine the number and/or accuracy of downlink reference signal measurements that are to be made to ensuring that the UE 110 meets the corresponding UE 110 beam correspondence requirements that have been determined based on the range of the DRX cycle while conserving power at the UE 110.

In some examples other factors can also be taken into account when determining the beam correspondence conditions. For instance, the beam correspondence conditions can also be determined based, at least in part, on one more characteristics of the UE 110. The characteristics of the UE 110 can comprise physical factors of the UE 110 and the environment around the UE 110 that affect power consumption and the beam correspondence. The characteristics of the UE 110 can comprise one or more of; hardware architecture of the UE 110, size of battery of UE 110, availability of a gyroscope within the UE 110, number of available panels, and/or any other suitable features In some examples the beam correspondence conditions can be dynamic. The dynamic beam correspondence conditions can vary over time. The beam correspondence conditions can be dependent upon factors that change over time such a battery level of the UE 110.

In some examples the method could also comprise one more additional blocks. For instance, The UE 110 could be configured to obtain measurements for maintaining beam correspondence in accordance with one or more indications from the network 100 with which the UE 110 is connected.

Other factors can be used to determine the beam correspondence conditions and the UL TX beam. For instance, the number of PRBs that are scheduled for when a UE 110 wakes up can also be a factor.

Figure 3:
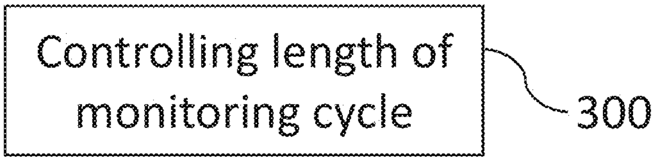
FIG. 3 shows another example method.

FIG. 3 shows another example method that can be used for beam correspondence during inactive modes of a UE 110. The method could be implemented by a UE 110. The method could be implemented by a controller of a UE 110.

At block 300 the method comprises controlling lengths of one or more monitoring cycles. The monitoring cycle is used to select a beam for transmission by the UE 110

The monitoring cycle is the duration of DL Reference Signal that the UE 110 needs to monitor with its panels during sleep before waking up and transmitting. The monitoring cycle can be used by the UE 110 to determine when to perform downlink reference signal measurements, how many downlink reference signal measurements to take and/or how accurate DL RS measurements need to be to ensure beam correspondence.

The lengths of the monitoring cycles can be controlled based, at least in part on a range of the DRX cycle and one or more power conditions of the UE 110.

The DRX cycles are used by the UE 110 during an inactive mode of the UE 110. The DRX cycles can determine when the UE 110 is to sleep for power saving purposes and when the UE 110 is to perform DL RS measurements, The range of the DRX cycles determines one or more beam correspondence conditions. The beam correspondence conditions can be defined so that different values for the respective beam correspondence conditions can be required for different ranges of DRX cycles. This can enable different levels of relaxation of the beam correspondence requirements based on different ranges of the DRX cycles.

The gNB 120 can configured the UE 110 with the DRX cycles. The range of the DRX cycles can be indicated by the gNB 120. In some examples a DRX cycle can be a short cycle or a long cycle. Other types or ranges of DRX cycle could be used. Different procedures can be used for the different ranges of the DRX cycles.

The beam correspondence conditions can be determined such that shorter DRX cycles have a higher level of accuracy for the beam correspondence requirements compared to the longer DRX cycles. The beam correspondence conditions can be as described above.

The beam correspondence conditions can be determined such that shorter DRX cycles have a higher level of UE 110 transmit power compared to the longer DRX cycle. The power level can be a minimum peak EIRP requirements, spherical coverage requirements and/or any other suitable requirements.

The inactive mode of the UE 110 can be an RRC_INACTIVE state or any other suitable mode. The network 100 can control which mode the UE 110 is in. During the inactive mode the UE 110 may be required to perform SDT communication.

The power conditions can be indicative of the available transmission power for the UE 110. The power conditions can comprise any suitable conditions such as UE 110 implementation factors, channel conditions, orientation of the UE 110 and/or any other suitable factors. The channel conditions can comprise factors such as path loss or power headroom. The orientation of the UE 110 can be determined using any suitable means. In some examples the orientation of the UE 110 can be determined by using a gyroscope. The gyroscope can give an indication of any change in the orientation of the UE 110 since the last monitoring cycle was made.

The UE 110 implementation factors can comprise any suitable factors that might affect the UE's 110 capacity to comply with beam correspondence requirements. The UE 110 implementation factors can comprise factors such as maximum power output of the UE 110, radio frequency architecture conditions, number of panels available in the UE 110, size of the arrays in the UE 110 and/or any other suitable factors.

The controlling of the lengths of the one or more monitoring cycles can be configured to conserve power of the UE 110. A goal of the UE 110 is to have the smallest monitoring cycle that will still enable meeting the beam correspondence requirements for the DRX cycle.

Figure 4:
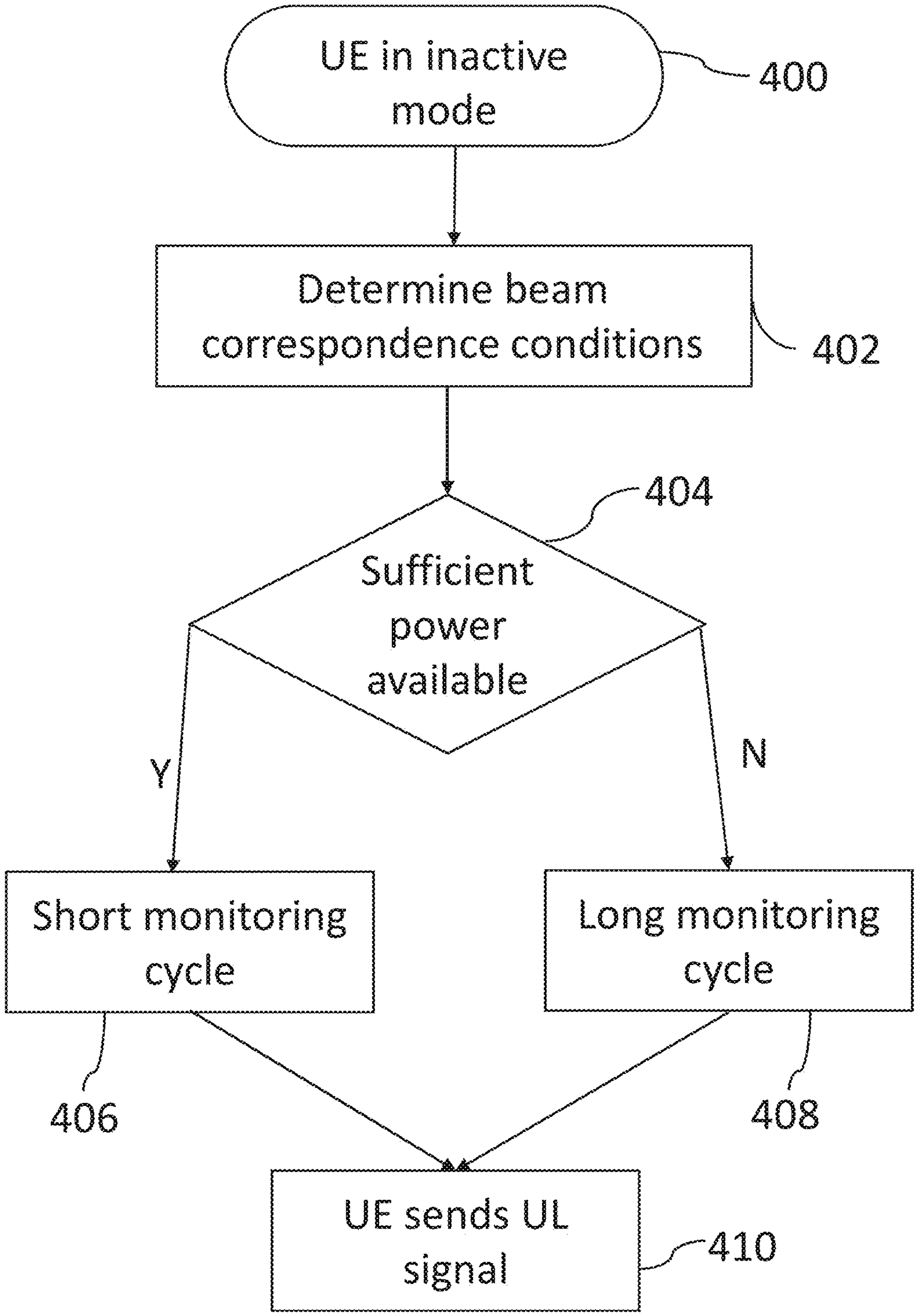
FIG. 4 shows another example method.

FIG. 4 shows another example method that can be used for beam correspondence during inactive modes of a UE 110. The method could be implemented by a UE 110. The method could be implemented by a controller of a UE 110.

At block 400 the UE 110 is configured into an inactive mode. The inactive mode could be an RRC_INACTIVE mode or any other suitable mode. The UE 110 can be configured for DRX transmission. The network 100 can specify the range of the DRX cycles that are to be used by the UE 110.

At block 402 the UE 110 determines the beam correspondence conditions that are to be used while the UE 110 is in the inactive mode. The UE 110 can determine the beam correspondence conditions based on the range of the DRX cycle. The beam correspondence conditions for DRX cycles having longer ranges can be more relaxed than the beam correspondence conditions for DRX cycles having shorter ranges.

At block 404 it is determined whether or not the UE 110 has sufficient transmission power available. Whether or not the UE 110 has sufficient transmission power available can be determined based on one or more power conditions of the UE 110. The power conditions could comprise the amount of power available to the UE 110, the loss levels of the antenna, path loss levels, power headroom, and/or any other suitable factor.

In some examples it can be determined that the UE 110 has sufficient transmission power available if:

$$PH > BC_{req}$$

Where PH is the power head room and BC is the beam correspondence power requirements.

If it is determined that the UE 110 has sufficient transmission power available then, the method moves to block 406 and the UE 110 uses a short monitoring cycle. In this example a short monitoring cycle is used. In some examples no monitoring cycles might be used. The monitoring cycle can be a DL Reference Signal (RS) monitoring cycle or any other suitable type of cycle.

In this case the short monitoring cycle does not need to find an accurate bean for UL by the UE 110 because the power available to the UE 110 is sufficient to enable successful transmission and reception even if the beam used is not accurate.

As an example, a short monitoring cycle could be used if the UE 110 has determined that a lot of power is available for transmission of UL signals. This could be the case if the UE 110 is a high power device with a high power source, if the antenna used for the transmission is a low loss antenna, if the UE 110 implementation is such that there is a low loss of power or if any other suitable factors apply. In this case a UE 110 having a plurality of panels cold transmit a UL signal from any panel and still attain the beam correspondence requirements. Therefore, because any panel can be used there is no need for a long monitoring cycle to determine an accurate beam to use. In this case a short monitoring cycle could be used. The short cycle could be very short, for example it could comprise just one sample. In some examples no monitoring cycle could be used.

In some examples a short monitoring cycle could be used if the UE 110 has determined that it is in good power conditions. The good power conditions could be a low path loss, a high power headroom, and/or any other conditions or combination of conditions. In this case it can be assumed that the panel used in the most recent time that the UE 110 was active will be the appropriate panel to use. Therefore a short monitoring cycle could be used.

In some examples the UE 110 could have precise knowledge of its orientation. This could be the case if the UE 110 comprises a gyroscope or other means for measuring orientation, or changes in orientation, of the UE 110. If the UE 110 is in a static, or substantially static environment, then a short monitoring cycle could be used.

If, at block 404, it is determined that the UE 110 does not have sufficient transmission power available then, the method moves to block 408 and the UE 110 uses a long monitoring cycle. The long monitoring cycle can be configured to fine a sufficiently accurate UL beam for the UE 110. The monitoring cycle can be a DL RS monitoring cycle or any other suitable type of cycle.

As an example, a longer monitoring cycle might be needed to ensure that beam correspondence conditions are satisfied. If the DRX cycle being used have a short range then tighter beam correspondence conditions could be used. These tighter conditions could require higher power transmission for the UE 110.

In some examples a longer monitoring cycle might be needed even if a long DRX cycle was used and beam correspondence conditions are relatively relaxed. For instance, if the UE 110 is a low power UE 110 or if there are high path losses then the transmission could fail if the correct beam is not used. In such cases a long monitoring cycle could be used to find the most accurate beam because simply increasing power is not an available option.

In some examples the length of the monitoring cycle that is to be used can be proportional to the available power. For instance, if the beam correspondence power requirements are greater than the power headroom then the number of monitoring cycles that are to be used can be proportional to:

$$BC_{req}-PH$$

In such cases the larger the difference between the power headroom and the beam correspondence power requirements the longer the monitoring cycle that would be needed.

After the monitoring cycles have been completed, at block 410 the UE 110 sends the UL signal.

In this example the number or monitoring cycles that need to be used corresponds to the beam correspondence conditions and the required level of beam accuracy, the power available for transmitting the UL signals.

In examples of the disclosure the testing of the UE 110 beam direction and power when waking up after a DRX cycle can be dependent on the range of the DRX cycle.

The test procedures can comprise:

CSI-RS parameters for beam correspondence based on SSB and CSI-RS

CSI-RS parameters for CSI-RS based beam correspondence

In examples of the disclosure the values used for these tests can be adjusted in dependence on the range of the DRX cycle. In some examples the values can scale according to the range of the DRX cycle. The table below shows example values that could be used. Assuming a 20 ms default SSB burst set, 120 KHz sub-carrier spacing and taking A.3.10.2.1 defined in 38.133 for SSB pattern 1 in Frequency Range 2 (FR2) as reference, UE power can be accordingly scaled based on the DRX cycles.

| SSB Parameters | Values | |
|---|---|---|
| Channel bandwidth | 100 MHz | |
| SSB SCS | 120 kHz | |
| SSB periodicity ($T_{SSB}$) | 20 ms | |
| Number of SSBs per SS-burst | 2 | |
| SS/PBCH block index | 0 | 1 |
| Symbol numbers containing SSBs *Note 2* | 4-7 | 8-11 |
| Slot numbers containing SSB *Note 2* | 0 | 0 |
| SFN containing SSB | SFN mod (max($T_{SSB}$, 10 ms)/10 ms) = 0 | |
| RB numbers containing SSBs within channel BW | ($RB_J$, $RB_{J+1}$, . . . , $RB_{J+19}$)*Note1* | |
| **DRX cycle** | **UE Power** | |
| <= 2 ms | Same as defined in 38.101-2 | |
| >= 2 ms to <= 10 ms | 3 dB additional | |
| >= 10 ms | +N dB additional | |

*Note 1*

RBs containing SSB can be configured in any frequency location within the cell bandwidth according to the allowed synchronization raster defined in TS 38.104 [13].

*Note 2*

These values have been derived from other parameters for information purposes (as per TS 38.213 [3]). They are not settable parameters themselves.

Additionally, the number of SS bursts to monitor during the DRX sleep cycle can scale depending on the length to ensure optimal bean correspondence. The table below provides example values.

| DRX cycle length | SS bursts to monitor |
|---|---|
| ≤5 ms | 3 |
| >10 ms | 6 |
| . . . | . . . |
| . . . | . . . |
| N | M |

Figure 5A:
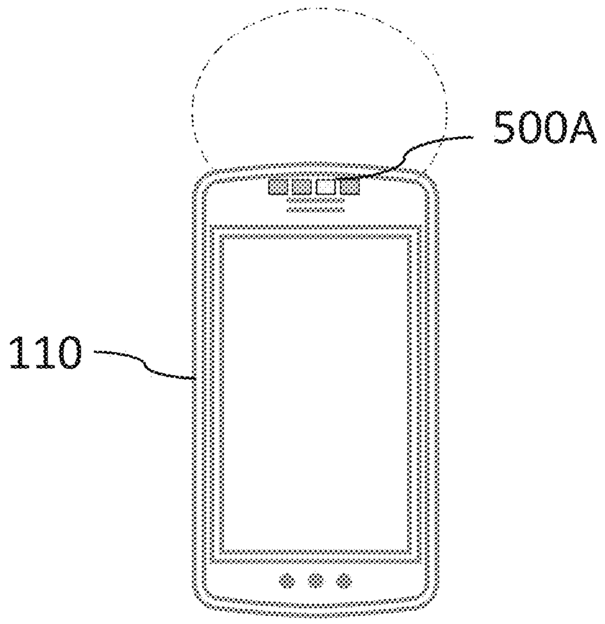
FIGS. 5A to 5D show example results.
Figure 5B:
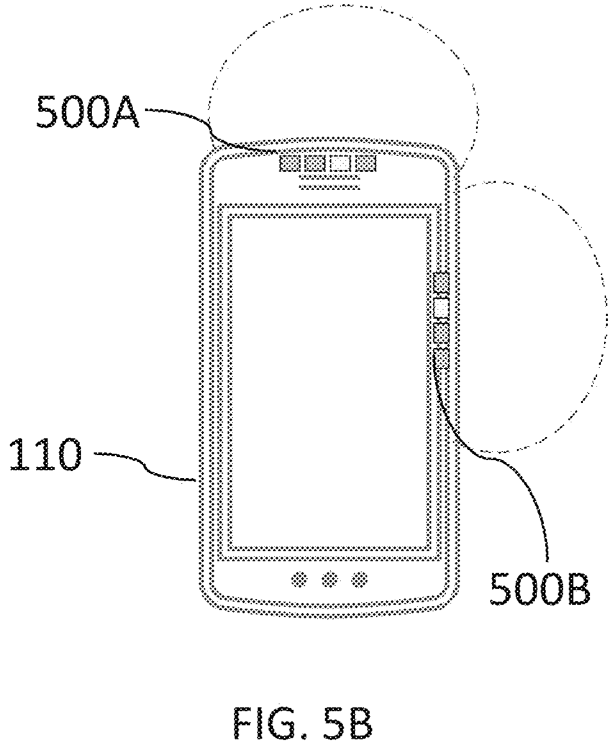
Figure 5C:
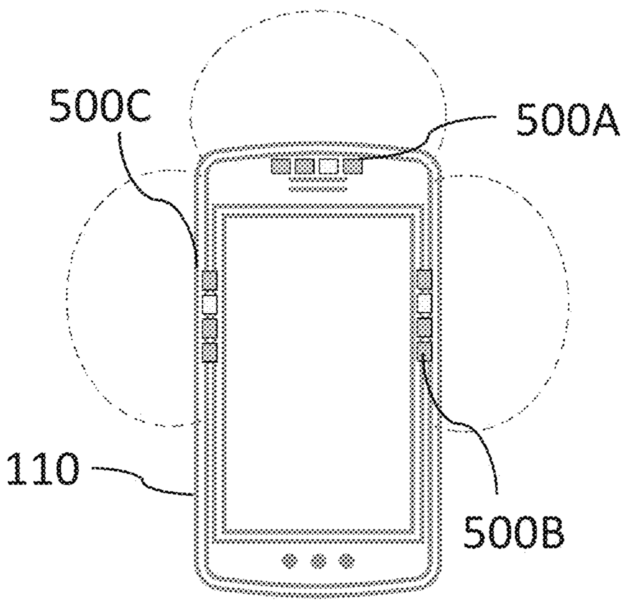

FIGS. 5A to 5D show example simulation results. FIGS. 5A, 5B and 5C show a UE 110. The UE 110 can use one or more panels 500 for transmission of the UL signals.

In FIG. 5A the UE 110 has only one panel 500A available for transmission of the UL signals. In FIG. 5B the UE 110 has two panels 500A, 500B available for transmission of the UL signals. In FIG. 5C the UE 110 has three panels 500A, 500B, 500C available for transmission of the UL signals.

Each of the panels 500 comprises a plurality of antenna elements. In the example of FIGS. 5A to 5C four antenna elements are shown. In the examples of FIGS. 5A to 5C only one of the antennal elements in the respective panels is activated.

Figure 5D:
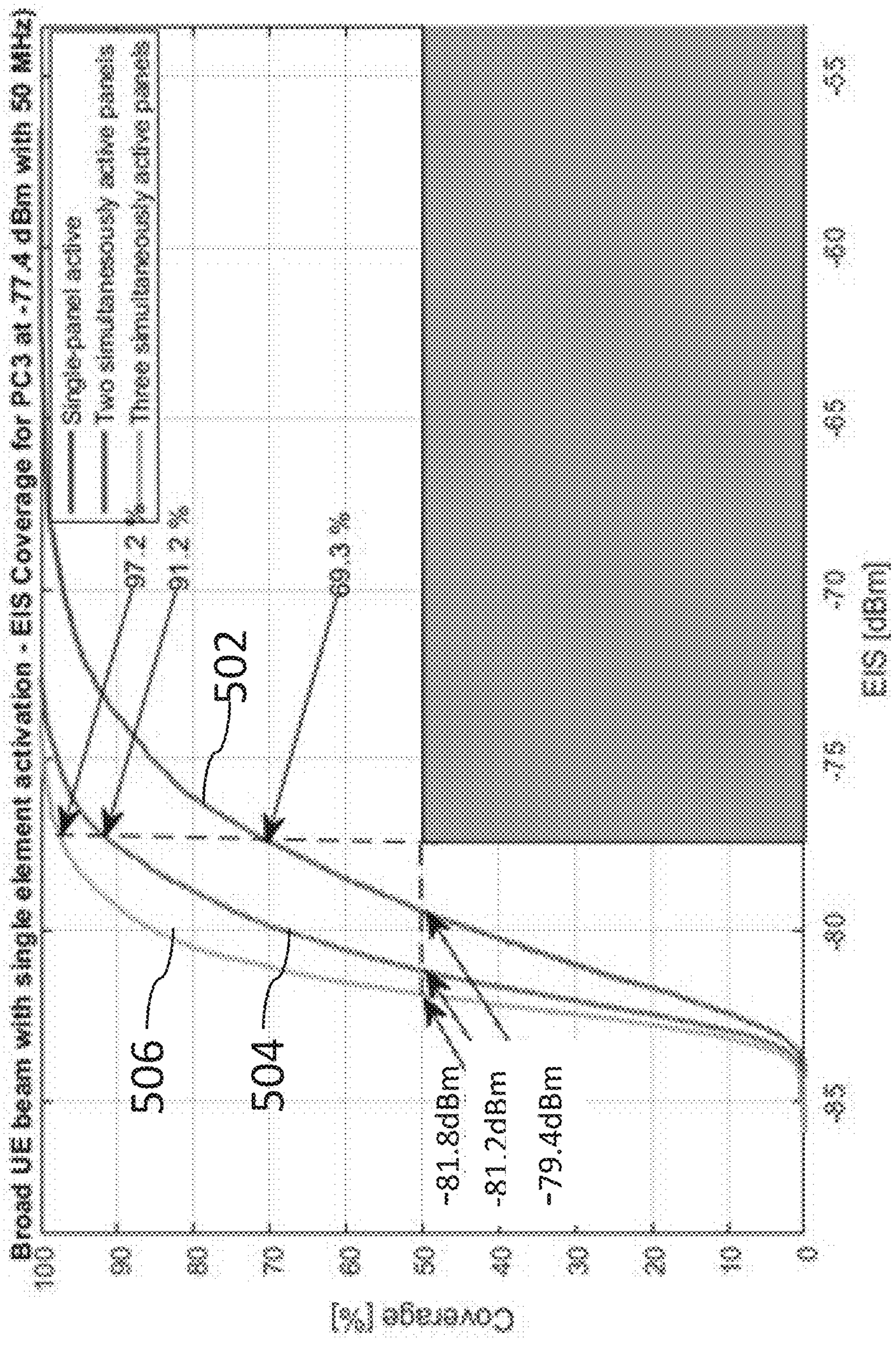

FIG. 5D shows Electromagnetic simulations on antenna design showing the spherical coverage on receiver sensitivity of the UE 110. A reference sensitivity level of −86.0 dBm at 50 MHz and 6 dB antenna implementation loss was used.

In FIG. 5D plot 502 shows the results of UE 110 with a single active panel, plot 504 shows the results of UE 110 with two active panels, and plot 506 shows the results of UE 110 with three active panels.

The results in FIG. 5D show that there is about 10 dB difference between best received signal and worse received signal on a 3-panel UE 110. This can be seen in the difference from −85 dB and −75 dB on the plot 506. The difference between best received signal and worse received signal is about 15 dB for single-panel UEs.

Therefore, the different levels of beam correspondence conditions can have a power difference that is smaller than 15 dBs.

Figure 6:
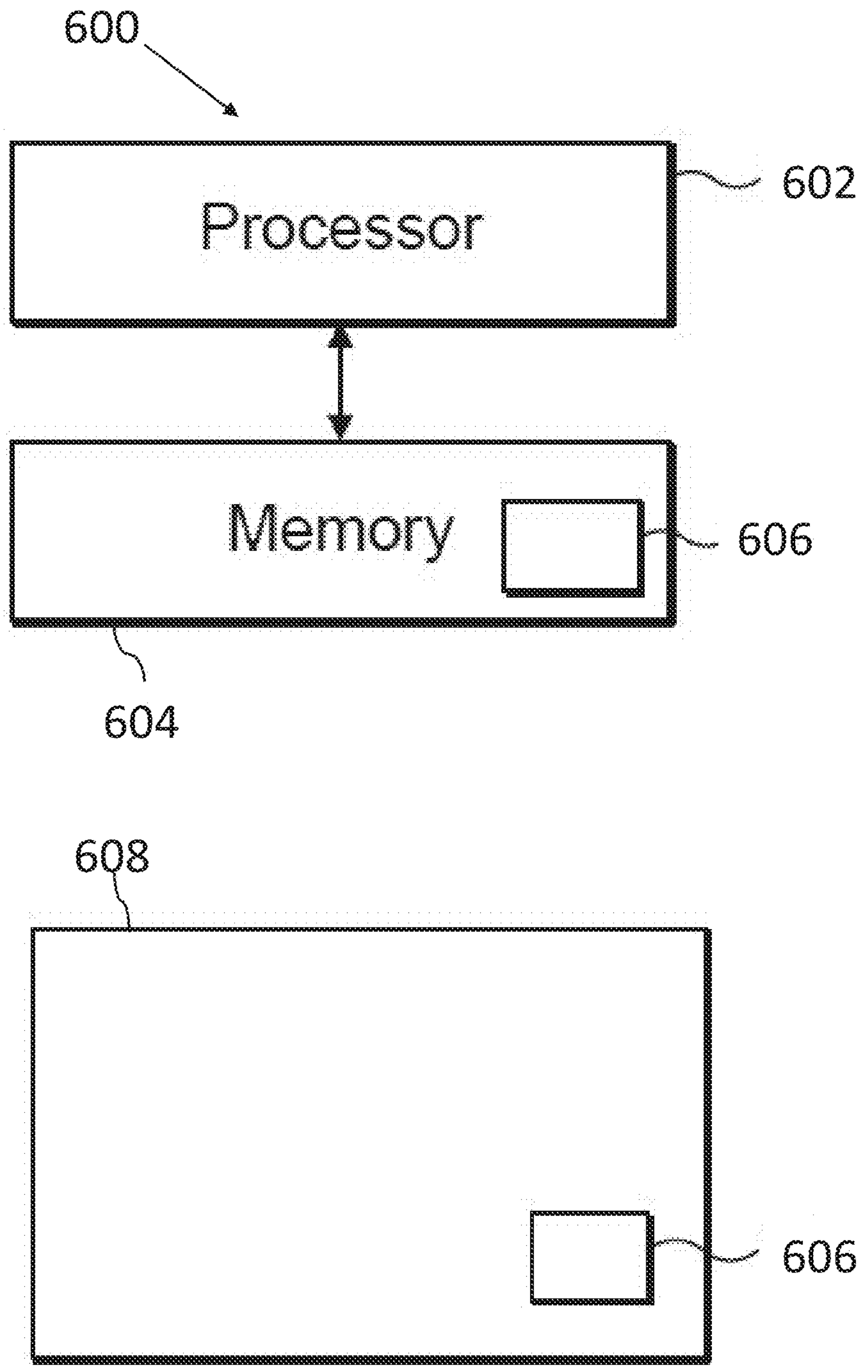
FIG. 6 shows an example controller.

FIG. 6 illustrates an example of a controller 600. The controller 600 could be provided within an apparatus such as a UE 110 or a network apparatus. Implementation of a controller 600 may be as controller circuitry. The controller 600 may be implemented in hardware alone, have certain aspects in software including firmware alone or can be a combination of hardware and software (including firmware).

As illustrated in FIG. 6 the controller 600 can be implemented using instructions that enable hardware functionality, for example, by using executable instructions of a computer program 606 in a general-purpose or special-purpose processor 602 that may be stored on a computer readable storage medium (disk, memory etc.) to be executed by such a processor 602.

The processor 602 is configured to read from and write to the memory 604. The processor 602 may also comprise an output interface via which data and/or commands are output by the processor 602 and an input interface via which data and/or commands are input to the processor 602.

The memory 604 stores a computer program 606 comprising computer program instructions (computer program code) that controls the operation of the apparatus when loaded into the processor 602. The computer program instructions, of the computer program 606, provide the logic and routines that enables the apparatus to perform the methods illustrated in the Figs. The processor 602 by reading the memory 604 is able to load and execute the computer program 606.

In examples where the controller 600 is provided within a UE 110 the controller 600 therefore comprises: at least one processor 602; and at least one memory 604 including computer program code 606, the at least one memory 604 storing instructions that, when executed by the at least one processor 602, cause a UE 110 at least to perform:

controlling 300 lengths of one or more monitoring cycles of the UE 110 based, at least in part on a range of a discontinuous reception (DRX) cycle and one or more power conditions of the UE 110, wherein the monitoring cycle is used to select a beam for transmission by the UE 110; and wherein, the DRX cycle is used by the UE 110 during RRC_INACTIVE state and the range of the DRX cycle determines one or more beam correspondence conditions.

The computer program 606 may arrive at the UE 110 via any suitable delivery mechanism 608. The delivery mechanism 608 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 606. The delivery mechanism may be a signal configured to reliably transfer the computer program 606. The apparatus may propagate or transmit the computer program 606 as a computer data signal.

The computer program 606 can comprise computer program instructions for causing a UE 110 to perform at least the following or for performing at least the following:

controlling 300 lengths of one or more monitoring cycles of the UE 110 based, at least in part on a range of a discontinuous reception (DRX) cycle and one or more power conditions of the UE 110, wherein the monitoring cycle is used to select a beam for transmission by the UE 110; and wherein, the DRX cycle is used by the UE 110 during RRC_INACTIVE state and the range of the DRX cycle determines one or more beam correspondence conditions.

The computer program instructions may be comprised in a computer program, a non-transitory computer readable medium, a computer program product, a machine readable medium. In some but not necessarily all examples, the computer program instructions may be distributed over more than one computer program.

Although the memory 604 is illustrated as a single component/circuitry it may be implemented as one or more separate components/circuitry some or all of which may be integrated/removable and/or may provide permanent/semi-permanent/dynamic/cached storage.

Although the processor 602 is illustrated as a single component/circuitry it may be implemented as one or more separate components/circuitry some or all of which may be integrated/removable. The processor 602 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in FIGS. 2 to 5 can represent steps in a method and/or sections of code in the computer program 606. The illustration of a particular order to the blocks does not necessarily imply that there is a required or preferred order for the blocks and the order and arrangement of the block may be varied. Furthermore, it can be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A User Equipment (UE) comprising:

at least one processor; and at least one memory storing instructions that, when executed by the at least one processor, cause the UE at least to perform:

controlling lengths of one or more monitoring cycles of the UE based, at least in part on a range of a discontinuous reception (DRX) cycle and one or more power conditions of the UE, wherein the monitoring cycle is used to select a beam for transmission by the UE; and wherein (i) the DRX cycle is used by the UE during an RRC_INACTIVE state and the range of the DRX cycle determines one or more beam correspondence conditions and (ii) the UE is able to meet the one or more beam correspondence conditions during the RRC_INACTIVE state by using a gyroscope to estimate a rotation of the UE in order to determine whether a previously selected beam remains valid for transmission by the UE.

2. The UE according to claim 1 wherein the power conditions are indicative of an available transmission power for the UE.

3. The UE according to claim 1 wherein the power conditions comprise one or more of: UE implementation factors, channel conditions, orientation of the UE.

4. The UE according to claim 3 wherein the UE implementation factors comprise at least one of: maximum power output, radio frequency architecture conditions, number of panels, size of the array.

5. The UE according to claim 1 wherein the controlling of the lengths of the one or more monitoring cycles is configured to conserve power of the UE.

6. The UE according to claim 1 wherein the range of the DRX cycle comprises at least one of: a short cycle, a long cycle.

7. The UE according to claim 1 wherein the beam correspondence conditions are determined such that shorter DRX cycles have a higher level of accuracy for the beam correspondence requirements compared to the longer DRX cycles.

8. The UE according to claim 1 wherein the beam correspondence conditions are determined such that shorter DRX cycle lengths have a higher level of UE transmit power compared to the longer DRX cycle lengths.

9. A method comprising:

controlling lengths of one or more monitoring cycles of a user equipment (UE) based, at least in part on a range of a discontinuous reception (DRX) cycle and one or more power conditions of the UE, wherein the monitoring cycle is used to select a beam for transmission by the UE; and wherein (i) the DRX cycle is used by the UE during an RRC_INACTIVE state and the range of the DRX cycle determines one or more beam correspondence conditions and (ii) the UE is able to meet the one or more beam correspondence conditions during the RRC_INACTIVE state by using a gyroscope to estimate a rotation of the UE in order to determine whether a previously selected beam remains valid for transmission by the UE.

10. The method according to claim 9 wherein the power conditions are indicative of an available transmission power for the UE.

11. The method according to claim 9 wherein the power conditions comprise one or more of: UE implementation factors, channel conditions, orientation of the UE.

12. A non-transitory computer readable storage medium comprising a computer program comprising computer program instructions that, when executed by processing circuitry, cause;

controlling lengths of one or more monitoring cycles of a user equipment (UE) based, at least in part on a range of a discontinuous reception (DRX) cycle and one or more power conditions of the UE, wherein the monitoring cycle is used to select a beam for transmission by the UE; and wherein (i) the DRX cycle is used by the UE during an RRC_INACTIVE state and the range of the DRX cycle determines one or more beam correspondence conditions and (ii) the UE is able to meet the one or more beam correspondence conditions during the RRC_INACTIVE state by using a gyroscope to estimate a rotation of the UE in order to determine whether a previously selected beam remains valid for transmission by the UE.

13. The computer program according to claim 12 wherein the power conditions are indicative of an available transmission power for the UE.

14. The computer program according to claim 12 wherein the power conditions comprise one or more of: UE implementation factors, channel conditions, orientation of the UE.

15. The UE according to claim 1 wherein the UE is further caused to:

estimate a correct panel for the UE to use when waking up from the RRC_INACTIVE state using the estimate of the rotation of the UE.

* * * * *